(Model.)

R. R. JONES.
TWO WHEELED VEHICLE.

No. 374,873. Patented Dec. 13, 1887.

Witnesses
Geo. Thorpe
R. W. Bishop

Inventor
Richard R. Jones,
by C. A. Snow & Co.
Attorneys

UNITED STATES PATENT OFFICE.

RICHARD R. JONES, OF LEXINGTON, VIRGINIA.

TWO-WHEELED VEHICLE.

SPECIFICATION forming part of Letters Patent No. 374,873, dated December 13, 1887.

Application filed June 22, 1887. Serial No. 242,163. (Model.)

*To all whom it may concern:*

Be it known that I, RICHARD R. JONES, of Lexington, in the county of Rockbridge and State of Virginia, have invented a new and useful Improvement in Two-Wheeled Vehicles, which improvement is fully set forth in the following specification and accompanying drawings.

Figure 1:
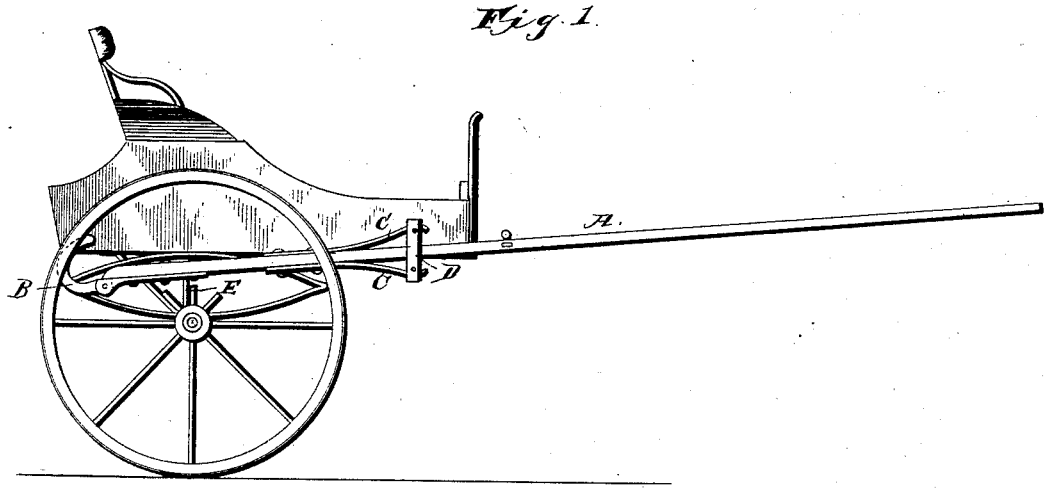
Figure 2:
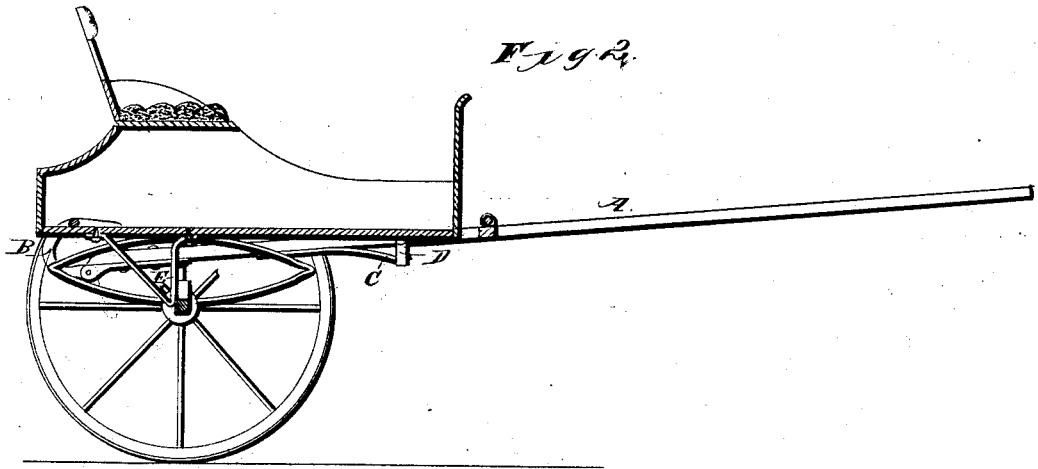

Figure 1 is a side elevation of a vehicle provided with my improvement, the near wheel being partly broken away; and Fig. 2 is a longitudinal vertical section of the same.

In the drawings, A A are the shafts.

B B are the arms by which the shafts or tongue is attached to the vehicle.

C C are the side springs upon the shafts or on the side bars of the tongue-frame.

D D represent the collars through which the shafts or side bars of the tongue-frame will pass. There are to be sockets at the upper and lower ends of these collars, through which the side springs will pass.

E E represent two triangular braces or stops, which are fastened to the body of the vehicle, and are designed to counteract or prevent in part the jerking and jolting of the vehicle when going over rough or uneven ground. These braces move freely against the axle up and down. They should be made of good iron or steel, and may, if desired, be wound with leather, india-rubber, or other soft substance to prevent too much friction and the rumbling or other unpleasant sound.

The body of the vehicle may be attached to the axle by elliptical or other springs.

Having thus described my invention, what I claim as new, and desire to secure by Letters Patent, is—

The triangular braces or bracket-shaped stops attached to the body of the vehicle and moving freely and vertically against and in rear of the axle.

March 23, 1887.

RICHARD R. JONES.

Witnesses:
    JAS. A. MOORE,
    WILLIAM A. ANDERSON.